(12) United States Patent
Reiniger et al.

(10) Patent No.: US 10,336,109 B2
(45) Date of Patent: Jul. 2, 2019

(54) MEASURING SYSTEM AND METHOD FOR CALIBRATING PRINTING STATIONS

(71) Applicant: KHS GmbH, Dortmund (DE)

(72) Inventors: Markus Reiniger, Mönchengladbach (DE); Sascha Koers, Bergkamen (DE); Katrin Preckel, Gelsenkirchen (DE); Daniel Teufert, Dortmund (DE); Werner Van De Wynckel, Humbeek (BE)

(73) Assignee: KHS GmbH, Dortmund (DE)

( * ) Notice: Subject to any disclaimer, the term of this patent is extended or adjusted under 35 U.S.C. 154(b) by 146 days.

(21) Appl. No.: 15/541,190

(22) PCT Filed: Dec. 21, 2015

(86) PCT No.: PCT/EP2015/080886
§ 371 (c)(1),
(2) Date: Jun. 30, 2017

(87) PCT Pub. No.: WO2016/113086
PCT Pub. Date: Jul. 21, 2016

(65) Prior Publication Data
US 2018/0009246 A1    Jan. 11, 2018

(30) Foreign Application Priority Data
Jan. 12, 2015    (DE) .................... 10 2015 100 337

(51) Int. Cl.
*B41J 25/304*    (2006.01)
*B41J 3/407*    (2006.01)
(Continued)

(52) U.S. Cl.
CPC .......... *B41J 25/304* (2013.01); *B41J 3/4073* (2013.01); *G01B 11/002* (2013.01); *G01B 11/24* (2013.01);
(Continued)

(58) Field of Classification Search
CPC .............................. B41J 3/4073; B41J 25/304
See application file for complete search history.

(56) References Cited

U.S. PATENT DOCUMENTS

2003/0132987 A1    7/2003  Ogawa
2004/0085735 A1    5/2004  Liu
(Continued)

FOREIGN PATENT DOCUMENTS

DE    10 2007 050 490    4/2009
DE    10 2009 033810    1/2011
(Continued)

*Primary Examiner* — Anh T Vo
(74) *Attorney, Agent, or Firm* — Occhiuti & Rohlicek LLP

(57) ABSTRACT

A measurement system includes a measurement device to detect measurement information relating to a position-modifiable component of a printing station during movement thereof. A calculation unit receives the measurement information from the measurement device. The calculation unit determines actual-position data of the position-modifiable component from the measurement data received and compares it with predetermined reference-position data to determine calibration information based on the actual-position data and the reference-position data. An interface permits then permits transfer of this calibration information.

20 Claims, 2 Drawing Sheets

(51) Int. Cl.
  *G01B 11/27* (2006.01)
  *G01B 11/25* (2006.01)
  *G01B 13/12* (2006.01)
  *B41F 17/18* (2006.01)
  *B41F 33/14* (2006.01)
  *G01B 11/28* (2006.01)
  *G01B 11/00* (2006.01)
  *G01B 11/24* (2006.01)

(52) U.S. Cl.
  CPC ........ *G01B 11/2504* (2013.01); *G01B 11/272* (2013.01); *G01B 11/28* (2013.01); *G01B 11/285* (2013.01); *G01B 13/12* (2013.01); *B41F 17/18* (2013.01); *B41F 33/14* (2013.01)

(56) References Cited

U.S. PATENT DOCUMENTS

| | | | |
|---|---|---|---|
| 2004/0263544 A1 | 12/2004 | Kojima | |
| 2006/0073268 A1 | 4/2006 | Bae et al. | |
| 2011/0050771 A1* | 3/2011 | Jywe | B41J 3/4073 347/14 |
| 2012/0199021 A1* | 8/2012 | Till | B41J 3/4073 101/36 |
| 2014/0242285 A1* | 8/2014 | Pettersson | B05B 12/124 427/427.2 |

FOREIGN PATENT DOCUMENTS

| | | |
|---|---|---|
| DE | 10 2012 005 046 | 9/2013 |
| EP | 2 799 150 | 11/2014 |
| WO | WO2004/085738 | 10/2004 |
| WO | WO2005/018813 | 3/2005 |

* cited by examiner

MEASURING SYSTEM AND METHOD FOR CALIBRATING PRINTING STATIONS

RELATED APPLICATIONS

This is the national stage, under 35 USC 371, of international application PCT/EP2015/0800886, filed on Dec. 21, 2015, which claims the benefit of the Jan. 12, 2015 priority date of DE 102015100337.6, the contents of which are herein incorporated by reference.

FIELD OF INVENTION

The invention relates to printing on containers, and in particular, to measurement systems used in print heads for such printing.

BACKGROUND

One type of device for printing on a container includes a transport element that rotates about a vertical axis. Such a device typically includes ink-jet printers having print heads.

An important factor for optically high-quality printing of containers is the most exact possible orientation of the print head relative to the container that is to be printed upon. As a result, print head calibration is important.

One way to spot calibration errors is to have two print heads print the same image. If the print heads are correctly calibrated, the images should be identical. Otherwise, one can infer a calibration error. A machine-vision system is useful for evaluating calibration in this way. Based on the detected error, one should, in principle, be able to adjust the print head to eliminate that error.

A disadvantage of the above method is that a print head can be adjusted with several degrees of freedom. In many cases, given a particular error, it is not always clear which type of adjustment should be made.

SUMMARY

An object of the invention is to provide a measuring system by means of which highly precise and time-saving measurement and calibration of one or more print heads of the printing station is possible.

According to a first aspect, the invention relates to a measuring system for the measurement of a printing station comprising a print head. The print head is adjustable in its position, in particular held at the printing station such as to be adjusted by means of a motor. As used herein, "adjustable" refers to translation and pivoting. The measuring system comprises in this situation in particular a measuring device, a calculation unit, and a (transfer) interface.

The measuring device is configured in particular for the detection of measurement information of a position-modifiable component of the printing station during movement thereof. The position-modifiable component can be the print head itself or ae position-modifiable print-head carrier that carries the print head.

The measuring device is coupled to the calculation unit for the transfer of measurement information. The calculation unit is configured for receiving measurement information provided by the measuring device and thus has a suitable interface that is connected to an interface of the measuring device. The calculation unit determines actual-position data of the position-modifiable component from captured measurement-information and compares this actual-position data with predetermined reference-position data for determining calibration information based on the actual-position data and the reference-position data. The reference-position data is position data that indicates a desired position or a desired movement path of the position-modifiable component.

The data can be deposited, for example, in a storage or memory unit connected to the calculation unit. This storage unit can be allocated to the measuring system, to the printing station, or to the printing device that comprises the printing station. In the latter case, the storage unit is a central, or common storage unit.

The calibration information determined in this way is provided to the transfer interface. It can then be further used in an appropriate manner. For example, it can be transferred to a storage unit allocated to the printing station. Accessing this storage unit thus permits calibration of the printing station.

As an alternative, it is possible to transfer the calibration information to a central or common storage unit allocated to the printing device. It is also possible for the printing station to be connected directly to the measuring system by way of the transfer interface in order to carry out a direct calibration of one or more print heads of the printing station.

An advantage of the measuring system arises from the ability to rapidly and more exactly calibrate the print head and doing so without reference to an image on a printed container.

According to one embodiment, the measuring device is configured for detecting three-dimensional measurement information. As a result, an exact recording of the actual position of the print head in three-dimensional space can be made.

Embodiments of the invention include those in which the measuring device is a camera, such as a 3D camera, and those in which the measuring device includes a laser scanner, preferably a 3D laser scanner. By means of these measuring devices, measurement information is determined with regard to the surfaces of the position-modifiable component in the printing station, which contains information about the locational position, in particular the three-dimensional position, of the position-modifiable component. Based on this measurement information, position correction values can be determined as calibration information.

Embodiments include those in which the position-modifiable component is the print-head carrier, a defined region of the print-head carrier, or a region of the print head. The print-head carrier can be, for example, a print-head holder that can be displaced in different spatial directions and/or a print-head holder capable of pivoting about at least one pivot axis. By recording measurement information at the print-head carrier or at the print head itself, the measurement information can be obtained without having to retrieve it from a common storage location.

According to some embodiments, the position-modifiable component is a print-head nozzle. The print-head nozzle represents the discharge point for the printing color or printing ink, and therefore constitutes an ideal measuring point to be determined by the measuring device.

According to other embodiments, the position-modifiable component is a reference surface of the print head. Depending on the type of print head used, a surface can be provided, for example, at the print head's housing or in the region of its nozzles.

According to yet other embodiments, the printing station is a replaceable printing-module and the measuring system is configured for the precise orientation and/or holding and measuring of this printing module. In some of these embodiments, the measuring system comprises a mounting or a stop for the printing module such that the printing module can be measured in the detached state, i.e. released from the rotor or the carrier element to which the printing module is secured in the installed state on the printing device. As a result, it is possible to attain a predetermined orientation between the measuring device and the position-modifiable component that is to be measured.

In still other embodiments, the interface is configured for coupling to a storage unit provided in the printing station or in the printing module and for transferring the calibration information to the storage unit. In those embodiments in which the printing station is configured as a replaceable printing-module, the measurement of the printing module can be carried out after its manufacture or after an inspection at the manufacturing plant. The calibration information can then be deposited in the storage unit. After the printing module is installed in the printing device, a calibration of the printing module can then be carried out on the basis of the calibration information that is carried by the printing module itself. It is also possible, for example, for the printing station or the printing module respectively to be recalibrated at certain time intervals on the basis of the calibration information.

In alternative embodiments, the interface is configured for coupling to a central storage unit that is connected to a plurality of printing stations and for transferring the calibration information to this central or common storage unit. Accordingly, the calibration information for all the printing stations of a printing device can be stored centrally. An allocation of the calibration information to a defined printing station is to be carried out, for example, by an identifier or by an addressing procedure. For the purposes of calibration, the calibration information can then be read out and the printing stations can be calibrated in accordance with the calibration information allocated to them.

In some embodiments, the calculation unit is configured for determination of calibration information that contains the movement information for the position-modifiable component, for the calibration of the said component to a desired position. For example, the calibration information can indicate the direction of movement and the amount of movement necessary to move from an actual position into a desired position. For this purpose, one or more encoders can be provided at the mechanism that moves the print head, by means of which either an absolute position or a position relative to a reference point, for example a reference mark or an end position, can be determined. The print head can therefore be moved exactly into a desired reference position. Other positioning methods are also possible.

Other embodiments include means for the exact positioning and/or orientation of the measuring device relative to the printing station. Such means can be, for example, optical means, that, by the detection of a reference surface or of another defined region of the printing station, allow for a desired orientation of the measuring device in relation to the printing station. Mechanical orientation means are also conceivable.

According to a further aspect, the invention relates to a method for calibrating printing stations that comprise a print head. Such a method includes providing a measuring device that is configured for the determination of measurement information of a position-modifiable component of the printing station; moving the position-modifiable component relative to the measuring device; determining measurement information during the movement of the position-modifiable component by the measuring device; transferring the measurement information to a calculation unit or a corresponding data storage unit; determining actual position data from the measurement information; determining calibration information from the actual position data and predetermined desired position data; and calibrating the print head based on the calibration information.

Data storage can take place on different systems and at different locations. Some embodiments deposit the measurement information in a storage unit of the printing module itself. This means that the information will always be available to that printing module. Accordingly, each printing module contributes its own unique characteristics of its own geometry and tolerance deviation at the connection or at the installation at the specified location on printing station or printing device.

In some embodiments, the printing module or the printing station comprises a port for receiving data, for example from a replaceable portable storage medium. Examples include a USB stick or USB flash drive, a micro SD card, a USB security dongle. The measuring and calibration data is then deposited on these replaceable media, which can, if appropriate, be stored separately from the printing modules or stations, backed up, and/or dispatched elsewhere.

This procedure makes it difficult to engage in unauthorized use of a printing module since without the portable storage medium relating to it calibration becomes difficult. In addition to the measuring and calibration data, the portable storage medium can include additional data concerning the printing module or the printing station.

With a variant of this, the measuring and calibration data for a number or plurality of printing modules or stations is deposited on only one of the portable storage media, wherein only one printing module, one printing station, or the printing device itself has a reception possibility and interface for this storage medium.

The data transfer from the measuring system onto the portable storage medium or memory is carried out in a known manner directly at the measuring system or downstream from a central control and calculation unit.

Naturally, the measured values can be stored and provided solely or also additionally in the control or storage unit of the printing device, the printing stations, or on a central server, in this case, in particular on the cloud so that it is available on-line. A storage space that is available on-line offers the advantage of making data more easy availability. In addition to being used for installation, this method is also advantageous for batch tracking and quality management.

An advantage of the methods and systems described herein is that the print head can be calibrated rapidly and precisely by the measurement of at least one position-modifiable component, to a defined desired position, and specifically without recourse to a printed image of a printed container.

According to one exemplary embodiment, the position-modifiable component can be moved during the determination of the measurement information in at least two, preferably three, independent spatial directions, and/or can be pivoted about at least one pivot axis. It is therefore possible for measurement information to be recorded that contains information about the movement path of the position-modifiable component. As a result, a more exact calibration of the printing station can advantageously be carried out.

According to one exemplary embodiment, measurement information is acquired relating to a print-head carrier and/or a region of the print head, in particular at least to a print-head nozzle or a reference surface of the print head.

According to one exemplary embodiment, the calibration method is carried out in two steps, wherein in a first measuring step, first a set of measurement information relating to the moved print-head carrier is determined and, in a second measuring step, a set of measurement information in respect of a region of the moved print head, in particular of a print-head nozzle or a reference surface area of print head is determined. Based on the measurement information determined in the first and second measuring steps, the calibration information is then determined. As a result of this, more exact calibration information can be acquired, and therefore a more exact calibration of the printing station. It is also possible, in the event of a replacement of the print head, for the measurement information acquired in the first measuring step to be used further, with the result that only the second measuring step needs to be repeated.

According to one exemplary embodiment, the printing station is calibrated directly by way of the calibration information determined. That is to say, the calibration information acquired is transferred via the interface of the measuring system directly to the printing station, and a calibration of the printing station is carried out directly on the basis of this calibration information.

As an alternative, it is possible for the calibration information to be deposited in a central storage unit, provided for a plurality of printing stations, and for the respective printing station to be calibrated after the transfer of the calibration information to this printing station.

As a further alternative, it is possible for the calibration information to be deposited in a storage unit provided in the respective printing station, and the printing station is then calibrated making use of the calibration information stored in the storage unit. It is therefore possible that, for example, with an exchangeable printing station configured as a printing module, the measurement and determination of the calibration information is carried out spatially and temporally separated from the actual calibration of the printing station, wherein, for example, the measurement is carried out at the manufacturing plant or at a maintenance company for the printing stations, and the calibration is not carried out until after the installation of the printing station into the printing device.

With the depositing of the calibration information in a central storage unit or a storage unit allocated to the respective printing station, it is possible for the printing station to be calibrated at certain specific time intervals, or, if the need for recalibration is determined, for recalibration to be carried out based on the stored calibration information.

The term "containers" means all containers, in particular bottles, cans, etc.

The expression "essentially" or "approximately" in the meaning of the invention signifies deviations from the exact value in each case by ±10%, preferably by ±5%, and/or deviations in the form of changes that are not of significance for the function.

Further embodiments, advantages, and possible applications of the invention are derived from both the following description of exemplary embodiments and from the figures. In this situation, all the features described and/or represented as images are in principle, alone or in any desired combination, the object of the invention, regardless of their combination in the claims or reference to them. The contents of the claims are also regarded as a constituent part of the description.

BRIEF DESCRIPTION OF THE DRAWINGS

These and other features and advantages will be apparent from the following detailed description and the accompanying figures, in which.

DETAILED DESCRIPTION

Figure 1:
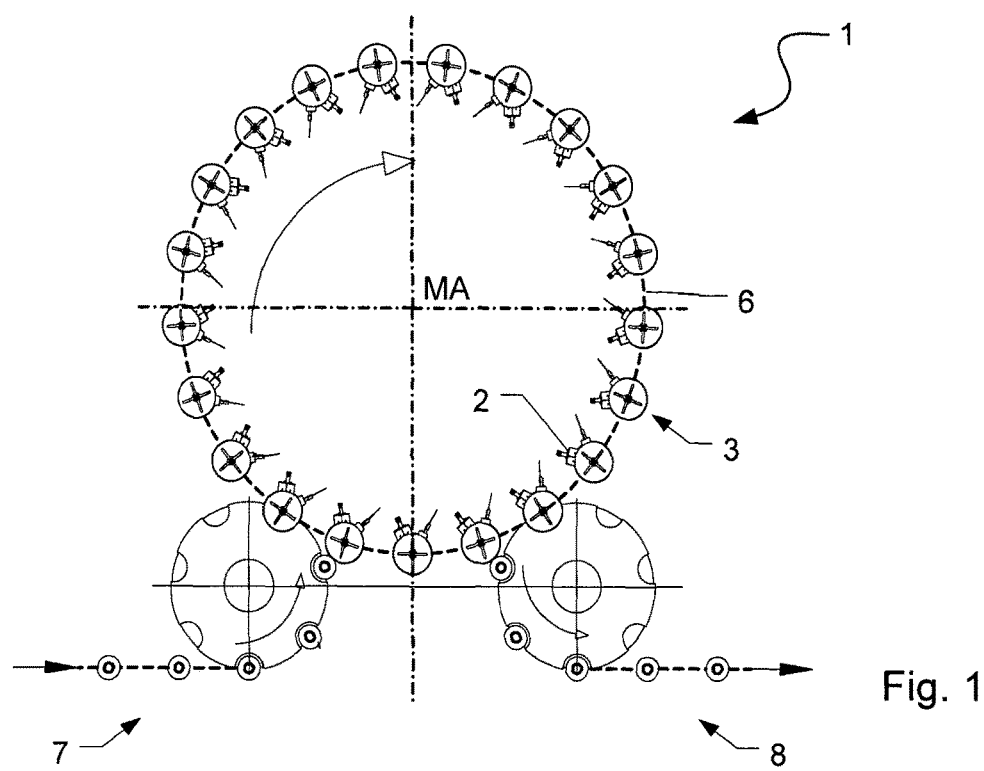
FIG. 1 shows a plan view of a printing device.

FIG. 1 shows a rotating printing-device 1 for printing bottles or similar containers. The printing device 1 includes plural printing stations 3, each of which has a digitally-actuated inkjet print-head 2.

Figure 2:
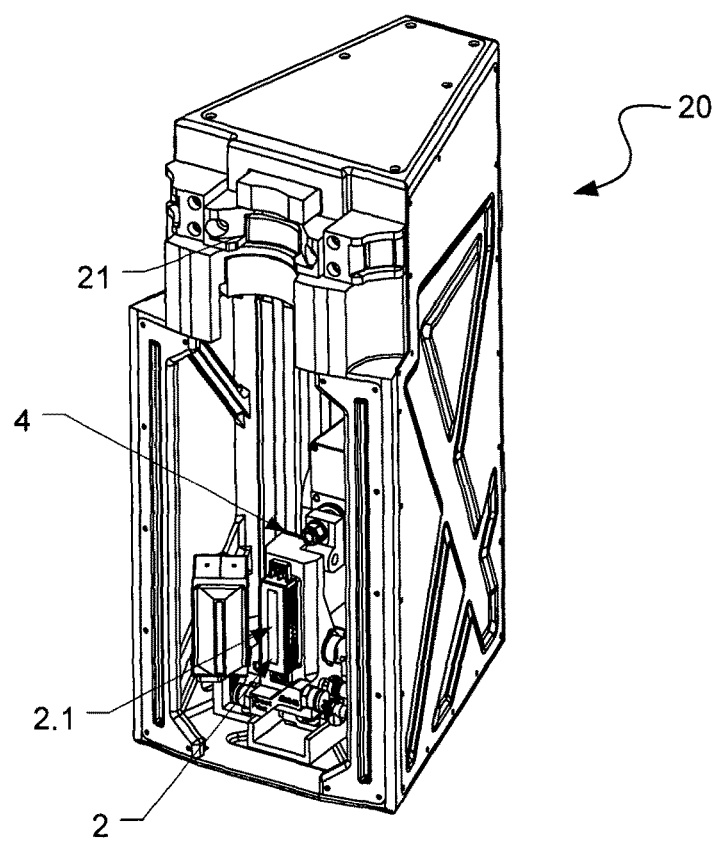
FIG. 2 shows a perspective view of a printing module at a printing station of the printing device of FIG. 1.

Referring now to FIG. 2, each print head 2 has nozzles 2.1 that can be electrically actuated individually, for example by an electrode or a piezoelectric element. In a typical arrangement, the nozzles 2.1 lie along a vertical line.

The printing device 1 includes a rotor 6 that is driven to rotate about a vertical machine axis MA, either intermittently or continuously. The printing stations 3 occupy the rotor's circumference. Each printing station 3 has one or more print heads 2 that move with the printing station 3.

Referring back to FIG. 1, a container inlet 7 receives containers to be printed upon and conveys them on to corresponding printing stations 3 on the rotor 6. Printing takes place as the container moves with the rotor 6. A container outlet 8 then removes containers, which have just been printed upon, from the rotor 6.

The printing of the containers at the printing stations 3 involves moving the container relative to the print head 2. In the particular embodiment shown, each container is oriented with its container axis in a vertical direction, i.e. parallel to the axis of rotation of the rotor 6. The container is then rotated in a controlled manner about its vertical container-axis during printing. The image is thus formed on a row-by-row basis as the container rotates past the print head 2.

The printing stations can be formed at the rotor 6 arranged and distributed individually on the rotor's circumference. In a typical implementation, at least one print head 2 and a container carrier, which is configured to receive a container, form a printing station 3. Further function elements can also be provided at the printing station 3. These include means for hardening the ink used during printing.

In an alternative modular implementation, a complete printing module 20 as shown in FIG. 2 forms each printing station 3. This is advantageous because a printing module 20 can be installed or replaced as a whole unit. In such embodiments, printing module 20 comprises a housing or at least a carrying structure that contains within it the function elements necessary for the function of the printing module 20. Such function elements include, but are not limited to a print head 2, a holding-and-centering unit for a container, and means for holding and releasing such a holding-and-centering unit.

A printing module 20 comprises a print head 2 with print-head nozzles 2.1. Some printing modules 20 have a receiver 21 for receiving a holding-and-centering unit. In other embodiments, the holding-and-centering unit is a constituent part of the printing module 20.

To promote high-precision printing of the container, it is useful to calibrate the print head 2. This permits the print head 2 to adopt a desired position during printing.

Figure 3:
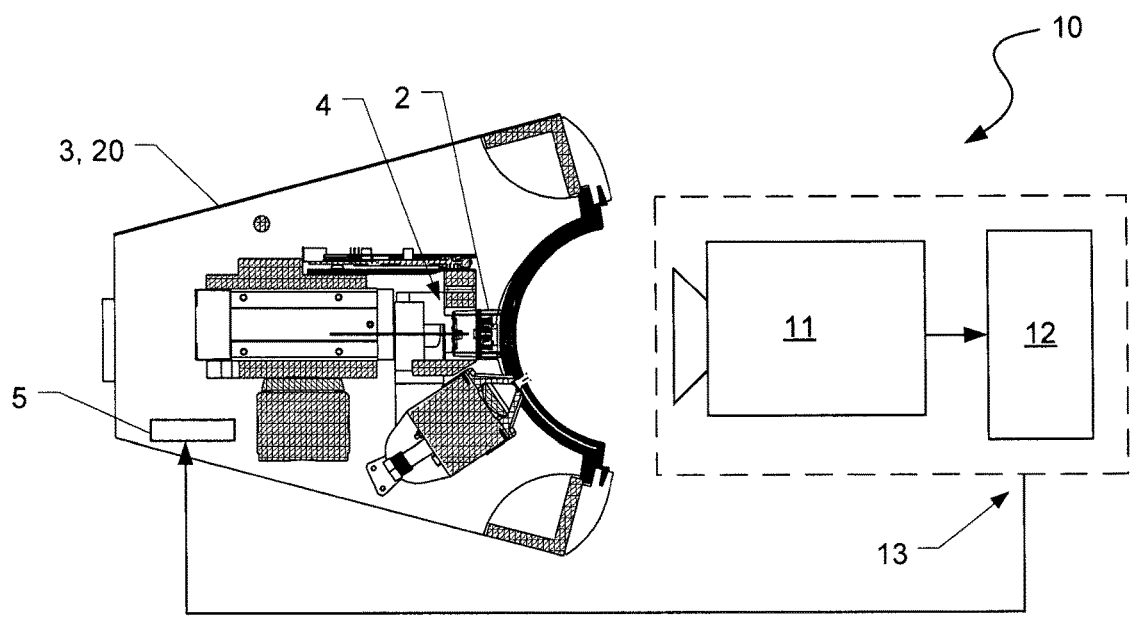
FIG. 3 shows a plan view of a measuring system upstream of the printing station.

FIG. 3 shows a measuring system 10 for calibrating a print head 2 of a printing station 3. Such a system can be used either for a printing station 3 that is within a printing module 20 or for a non-modular printing station 3 that has individual components arranged at the rotor 6.

The measuring system 10 comprises a measuring device 11, a calculation unit 12, and a transfer interface 13. In a typical embodiment, the measuring devices 11 uses an optical measuring-method for locating a position-modifiable component of the printing station 3. Examples of a position-modifiable component include the print head 2 itself or a print-head carrier 4 that holds and carries the print head 2. The measuring device 11 obtains measurement information indicative of the location and orientation of the position-modifiable component.

A suitable measuring device 11 is one that relies on a camera, such as a 3D-camera. Other suitable measuring devices 11 rely on a laser scanner. In either case, the measuring device 11 is configured for recording multi-dimensional, and in particular, three-dimensional, location information relating to the position-modifiable component.

In some embodiments of the measuring device 11, a 3D laser scanner provides three-dimensional cloud diagrams and therefore a complete multi-dimensional image of either the position-modifiable component or at least of a section of the position-modifiable component. This then serves as a measuring point. On the basis of the cloud diagram, the measuring device 11 determines such geometric values as lengths and angles. Measuring devices 11 that rely on a 3D camera obtain image information that allows geometric measurement of the recorded components of the printing station 3.

Embodiments include those in which the position-modifiable component translates along a spatial direction, and in particular, along any one of three mutually orthogonal spatial directions, and also pivots about at least one pivot axis. The ability to pivot is particularly useful when printing on an oblique surface. Preferably, the position-modifiable component is moved and/or pivoted over its entire adjustment range. In alternative embodiments, the position-modifiable component can only be moved to selected points in its adjustment range.

In a preferred embodiment, the measuring device 11 records information while the position-modifiable component moves. During this movement, the measuring device 11 records information indicative of location and/or orientation and transfers it to a calculation unit 12, either via a wired connection or by a wireless connection.

From this received measurement information, the calculation unit 12 determines actual-position data. The actual-position data includes measured positions of the position-modifiable component at different times as it moves through the three-dimensional space.

The measuring system 10 also includes storage for storing reference-position data. This reference-position data represents where the position-modifiable component is supposed to be assuming that the printing system has been correctly calibrated. Comparison of the actual-position data with the reference-position data thus provides a basis for obtaining calibration information that can then be used for calibrating the print head 2.

In some embodiments, the calculation unit 12 determines deviations between the actual-position data and the reference-position data. Then, based on such deviations, the calculation unit 12 derives calibration information. In some embodiments, this calibration information takes the form of adjustment values that indicate how the print head 2 should be adjusted to arrive at the corresponding reference-position values.

In other embodiments, the calculation unit 12 carries out an optimization procedure that relies on a large number of position values from both the actual-position data and the reference-position data to determine adjustment values that are best suited for calibrating the print head 2. These adjustment values indicate by what amount and in what direction the position-modifiable component must be moved or pivoted to arrive at the desired values. The measuring system 10 then outputs the relevant calibration information through an interface 13.

The calibration of the print head 2 based on the calibration information can be carried out in different ways.

In a first embodiment, the calibration information is transferred directly to the printing station 3. Calibration of the print head 2 is then carried out by actuating motorized actuators. These actuators adjust the print head's position according to the calibration information, thus moving the print head 2 into a calibrated position.

In other embodiments, the calibration information is stored temporarily in storage of the measuring system 10.

FIG. 3 shows a second embodiment in which the printing station 3 includes local storage 5 that is allocated to that printing station 3. This is advantageous when the printing stations 3 are configured as replaceable printing modules 20 that can be swapped in and out of the rotor 6 because calibration can then proceed without having to retrieve calibration information from some common storage unit. Instead, it is possible to just use the calibration information carried by the printer station 3 itself in its own local storage 5.

In some examples, the measuring system 10 determines calibration information after maintenance or repair of components of a printing module 20 remotely from the installation location of the device 1. This calibration information is then stored in the printing module 20 itself. Upon connection of the printing module 20 to the rotor 6, the actual calibration can be carried out using calibration information that the printing module 20 has brought with it in its local storage 5.

Figure 4:
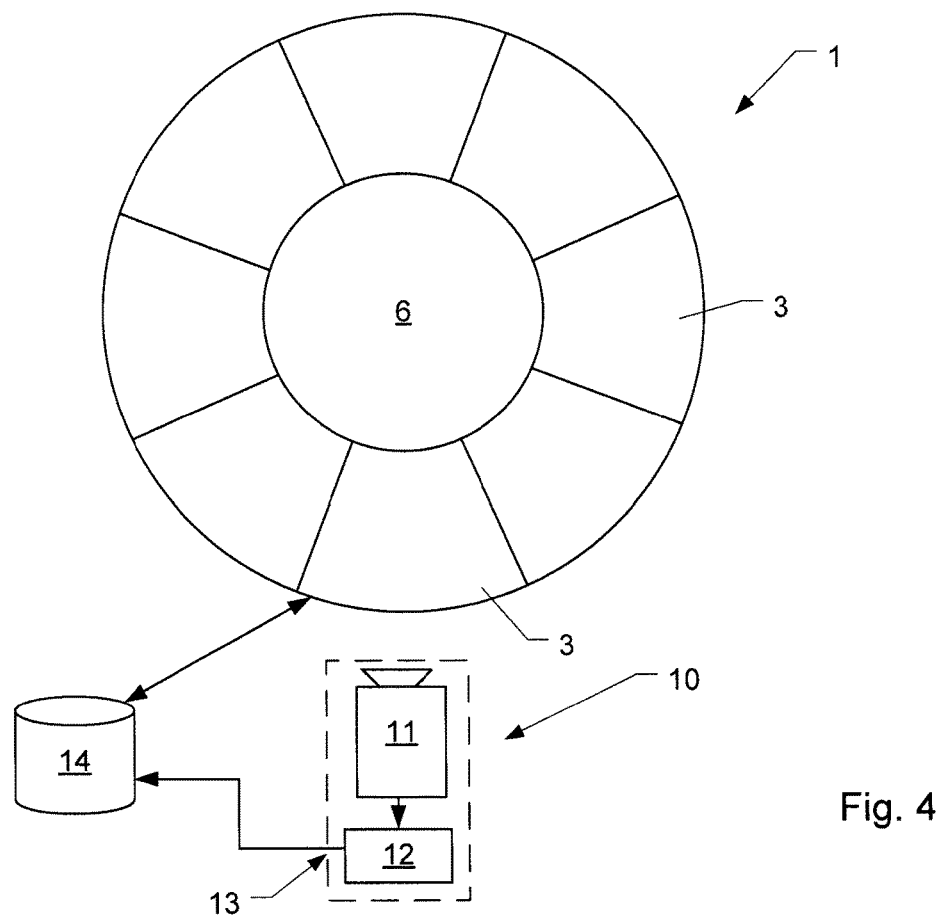
FIG. 4 shows a measuring system upstream of a rotor comprising a plurality of printing stations.

A third embodiment, shown in FIG. 4, includes common storage 14 allocated to the printing device 1 in which calibration information can be stored. The common storage 14 is available to all of the printing stations 3 of the printing device 1. As a result, each printing station 3 can retrieve relevant calibration information for use in its own calibration.

An alternative embodiment includes storage the measuring system 10 or allocated to the measuring system 10.

In some embodiments, the measuring system 10 adjusts to the configuration of the printing station 3 or the printing device 1 respectively. For example, if the printing stations 3 are configured as exchangeable printing modules 20, the measuring system 10 is configured such as to accommodate a printing module 20. This can be achieved by providing a holding mounting, a receiver, or a stop at the measuring system 10 to be used in connection with orienting the printing module 20 in a desired position relative to the measuring device 11.

For those cases in which the printing stations 3 at the rotor 6 are not exchangeable but nevertheless need calibration, the measuring system 10 shown in FIG. 4 is upstream of the rotor 6. In such embodiments, a stand or a similar structure supports the measuring device 11 at the height of the print heads 2 upstream of the rotor 6 in such a way that it is possible to record measurement information from a print head 2 or a print-head carrier 4.

When determining actual-position data from the measurement information obtained from the measuring device 11, it is useful to have a reference point. A suitable reference point is a region of the printing station 3 that does not move with the position-modifiable component. One structure that is suitable for this purpose is a receiver 21 for a holding-or-centering unit, as shown in the upper-left corner of FIG. 2. In those cases in which the holding-and-centering unit is a constituent part of the printing station 3, it is possible to rely on a region of the holding-and-centering unit itself.

Some embodiments achieve greater calibration precision by carrying out measurement or calibration of the printing station 3 in several steps. Among these are embodiments in which there are two separate steps.

A first step includes measuring the position of the print-head carrier 4. This is the structure that holds the print head 2 as it changes its position within the printing station 3, and in particular, as it moves over part of its adjustment range or its entire adjustment range. A preferred embodiment carries out this first step with the print head 2 dismantled.

This first step results in storing a first set of measurement information at either the common storage 14 or at the local storage 5. This stored first-set includes information indicative of the actual position of the print-head carrier 4 at different adjustment positions.

After the first measurement-step, the print head 2 is installed on the print-head carrier 4. Then comes a second measurement-step. The second measurement-step includes measuring the print-head's position as it moves over part of its adjustment range or over its entire adjustment range. Since the print head 2 is an extended object, it is preferable to pick a reference point on the print head 2 and to use the position of that reference point as a basis for the print-head's position. A suitable reference point is point on the print-head's surface or a print-head's nozzle 2.1.

This second step results in second set of measurement-information. The calibration information is then calculated based on the both the first set and the second set.

The invention has been described heretofore by way of exemplary embodiments. It is understood that a large number of modifications or derivations are possible, without thereby departing from the inventive concept underlying the invention.

The invention claimed is:

1. An apparatus comprising a measurement system for making measurements at a printing station that includes a print head that is adjustably held at a position at said printing station, said measurement system comprising a measurement device, a calculation unit, and an interface, wherein said measurement device is configured to detect measurement information relating to a position-modifiable component of said printing station during movement thereof, wherein said calculation unit is configured to receive said measurement information from said measurement device, wherein said calculation unit is further configured to determine actual-position data of said position-modifiable component from said measurement information received and to compare said actual-position data with predetermined reference-position data, and to determine calibration information based on said actual-position data and said reference-position data, and wherein said interface permits transfer of said calibration information.

2. The apparatus of claim 1, wherein said measurement device is configured to determine position in three dimensions.

3. The apparatus of claim 1, wherein said measurement device comprises a 3D camera.

4. The apparatus of claim 1, wherein said measurement device comprises a laser scanner that creates three-dimensional cloud diagrams to permit deriving a multi-dimensional image of at least a section of said position-modifiable component.

5. The apparatus of claim 1, wherein said reference-position data represents where said position-modifiable component is supposed to be when said printing station has been correctly calibrated and wherein said calculation unit is configured to determine deviations between said reference-position data and said actual-position data, said calibration being derived at least in part based on said deviations.

6. The apparatus of claim 1, wherein said position-modifiable component is a reference surface of said print head.

7. The apparatus of claim 1, wherein said printing station comprises an exchangeable printing module, wherein said measurement system is configured for holding said printing module at a particular orientation and for carrying out measurements on said printing module.

8. The apparatus of claim 1, further comprising common storage for storing calibration information for plural printing stations, wherein said interface is configured for coupling with said common storage.

9. The apparatus of claim 1, further comprising common storage, wherein said interface is configured for coupling to said common storage and for transferring said calibration information to said common storage, wherein said common storage is a constituent of a printing device comprising plural print stations, and wherein said common storage contains calibration for said plural print stations.

10. The apparatus of claim 1, wherein said calculation unit is configured for determining calibration information for calibrating said print head, wherein said calibration information comprises information indicative of movement of said position-modifiable component.

11. A method comprising calibrating a printing station, wherein calibrating said printing station comprises moving a position-modifiable component of said printing station, while moving said component, measuring at least one of position and orientation of said component, thereby generating measurement information, receiving said measurement information, determining actual-position data from said measurement information, determining calibration information from said actual-position data and predetermined reference-position data, and calibrating said print head based on said calibration information.

12. The method of claim 11, further comprising carrying out an optimization procedure that relies on a large number of position values from both said actual-position data and said reference-position data to determine adjustment values that are best suited for calibrating said printing station, said adjustment values being indicative of magnitude and direction of movement required for said position-modifiable component to arrive at a desired value.

13. The method of claim 11, wherein determining calibration information comprises determining said calibration information after maintenance or repair of a component of said printing station at a location that is remote from where said printing station is to be installed for printing and storing said calibration information at said printing station such that, upon installation of said printing station at any location where said printing station is to be installed, said calibration information thereby being carried by said printing station.

14. The method of claim 11, further comprising defining a reference point from which said actual position is measured, said reference point being a region of said printing station that remains stationary as said position-modifiable component moves.

15. The method of claim 14, further comprising selecting said reference point to be a receiver of a holding-or-centering unit.

16. The method of claim 11, further comprising selecting said position-modifiable component to be a reference surface of said print head.

17. The method of claim 11, further comprising selecting said position-modifiable component to be a print-head carrier, removing said print head from said print-head carrier, after measuring at least one of position and orientation of said component, reinstalling said print head on said print-head carrier, and measuring at least one of position and orientation of said print head, thereby generating measurement information indicative of movement of said print head, and wherein determining said calibration information comprises determining said calibration information based on said first and second sets.

18. The method of claim 11, wherein calibrating said print head comprises calibrating said print head directly using said calibration information.

19. The method of claim 11, further comprising depositing said calibration information in common storage that is accessible to plural printing stations, each of which has printer-specific calibration information stored in said common storage, and wherein calibrating said print head comprises retrieving said calibration information that is specific to said print head from said common storage.

20. The method of claim 11, further comprising depositing said calibration information in storage local to said printing station, wherein said storage such that, when said printing station is swapped out to another location, calibration of said printing station can proceed without having to retrieve calibration information from a common storage unit, and wherein calibrating said print head comprises retrieving said calibration information from said storage that is local to said printing station.

* * * * *